(No Model.) 4 Sheets—Sheet 1.

G. H. MILLEN & E. MOUSSEAU.
PLUG BOX MACHINE.

No. 390,888. Patented Oct. 9, 1888.

Witnesses:
J. G. Jones.
F. T. Chapman.

Inventors.
George H. Millen
Edward Mousseau
By P. T. Dodge, Atty.

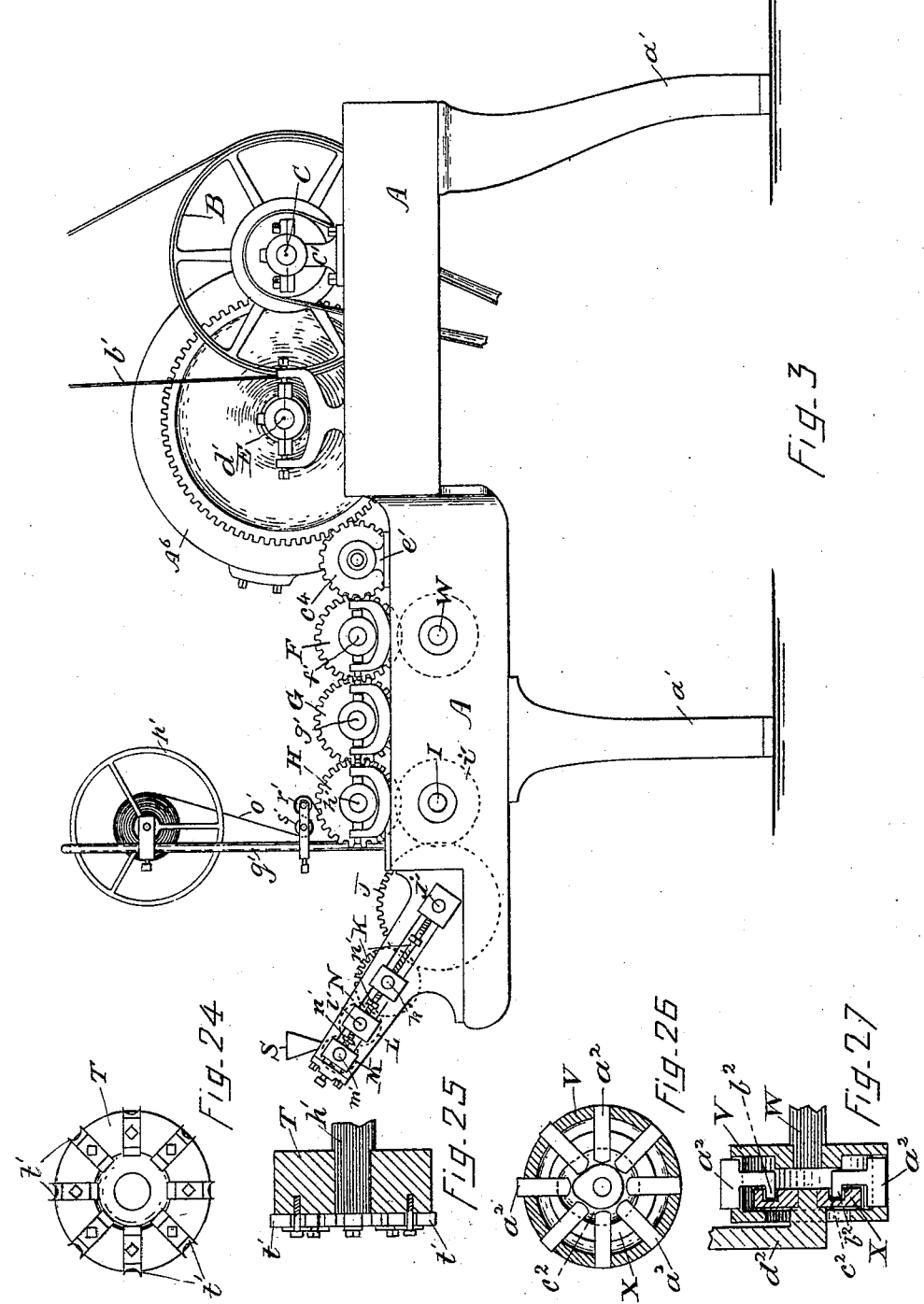

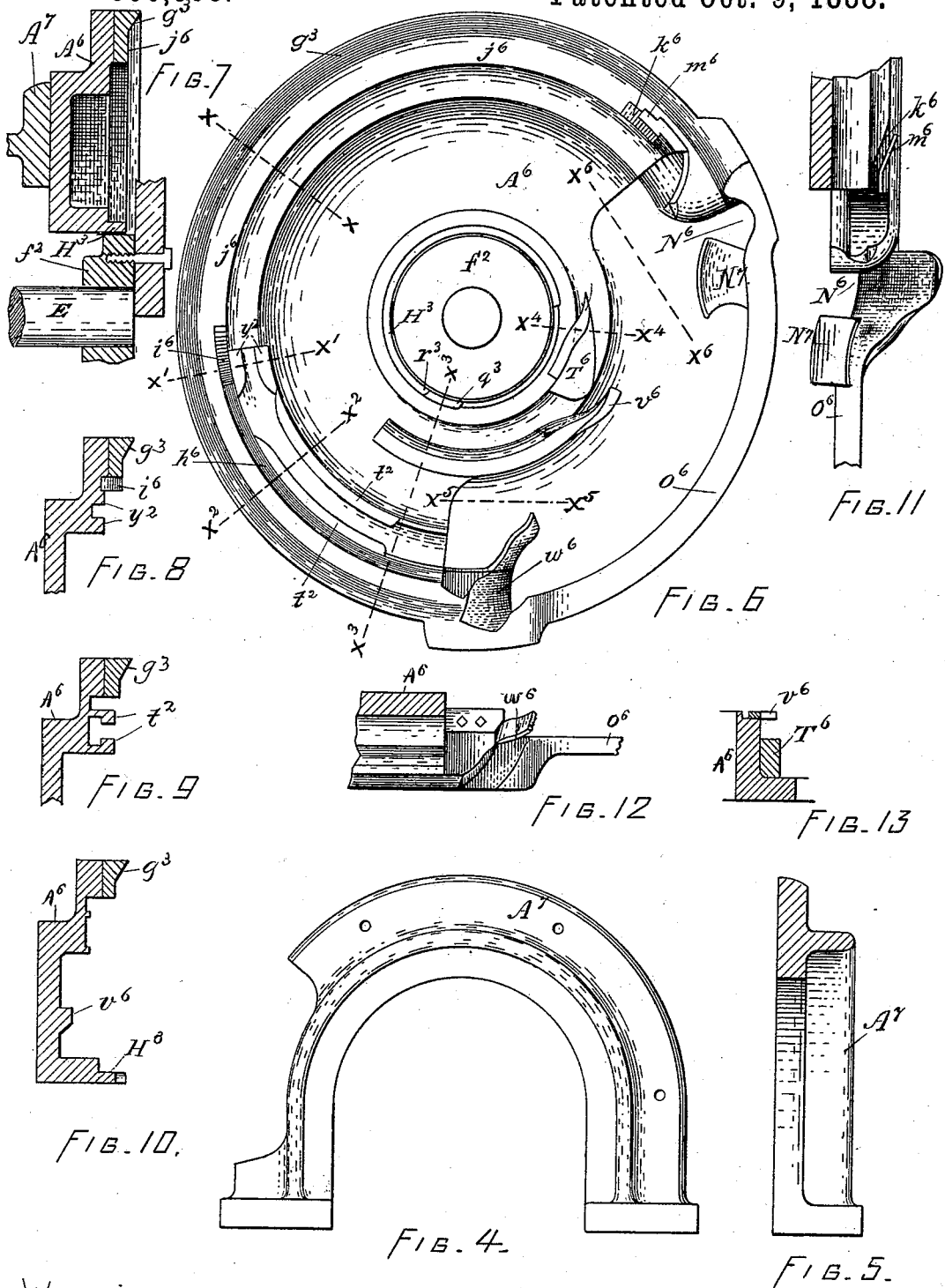

(No Model.) 4 Sheets—Sheet 4.

G. H. MILLEN & E. MOUSSEAU.
PLUG BOX MACHINE.

No. 390,888. Patented Oct. 9, 1888.

WITNESSES:
J. G. Jones,
F. T. Chapman.

INVENTORS.
George H. Millen.
Edward Mousseau.
By P. T. Dodge, Atty.

UNITED STATES PATENT OFFICE.

GEORGE H. MILLEN AND EDWARD MOUSSEAU, OF HULL, QUEBEC, CANADA, ASSIGNORS OF ONE-THIRD TO THE E. B. EDDY MANUFACTURING COMPANY, OF SAME PLACE.

PLUG-BOX MACHINE.

SPECIFICATION forming part of Letters Patent No. 390,888, dated October 9, 1888.

Application filed June 1, 1887. Serial No. 239,977. (No model.)

*To all whom it may concern:*

Be it known that we, GEORGE H. MILLEN and EDWARD MOUSSEAU, citizens of Canada, residing at Hull, in the county of Ottawa and Province of Quebec, Canada, have invented certain new and useful Improvements in Plug-Box Machines; and we do hereby declare the following to be a full, clear, and exact description of the same.

Our invention relates to the manufacture of paper tubular boxes, such as are commonly known by the name of "plug-boxes," and which are made in two parts, one end of each part being closed, the deeper part, which we will for convenience herein call the "box," being made smaller in transverse sectional area than the other part, which we will call the "cover," so as to slide into it.

Among the objects sought to be obtained by our invention are, the manufacture of plug-boxes by means of continuous onward rotary motion in a box-making machine and the speedy production of complete boxes at the expense of little labor.

The paper of which the boxes are to be made is prepared for the machine hereinafter described, and which embodies our invention, by cutting it into strips of any convenient length and of a width equal to the depth of the box and its width. The paper thus prepared is made into a roll and placed on a reel, from which it is taken by the machine in an even and uninterrupted motion. After leaving the reel the paper ribbon first passes down to a type-roll, which stamps upon it at regular intervals the inscription or device which the boxes are to bear. From this it passes to a gluing-roll, by which the glue is deposited on the paper in the shape and quantity desired. It is next seized by a folding mechanism, cut off by shears, and the sides and end of the box-piece folded up and held until the glue has set, after which it is shoved from the machine finished.

In the following description of our invention reference will be had to the accompanying drawings, in which—

Figure 1:
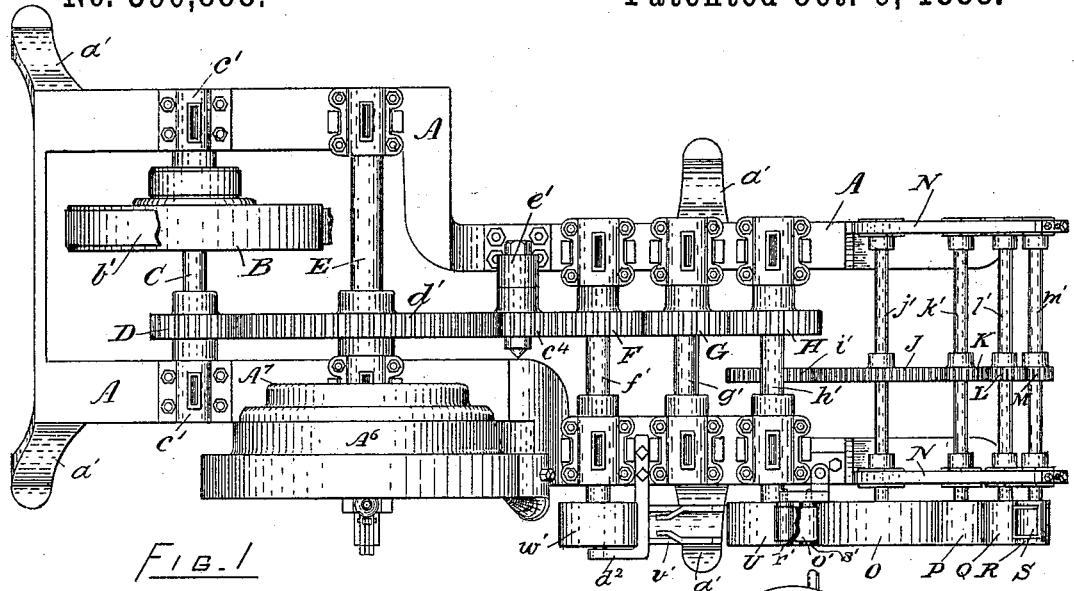
Figure 2:
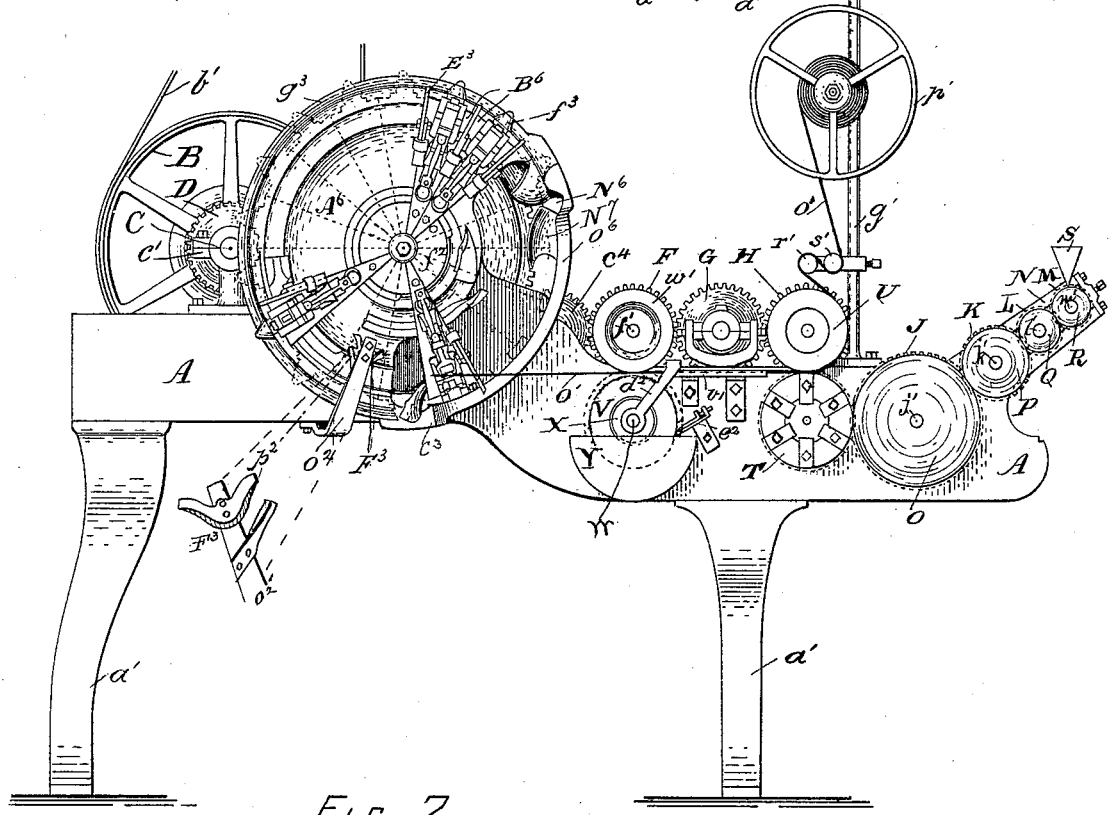
Figure 14:
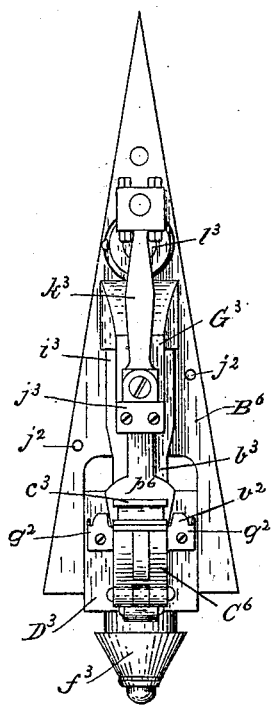
Figure 15:
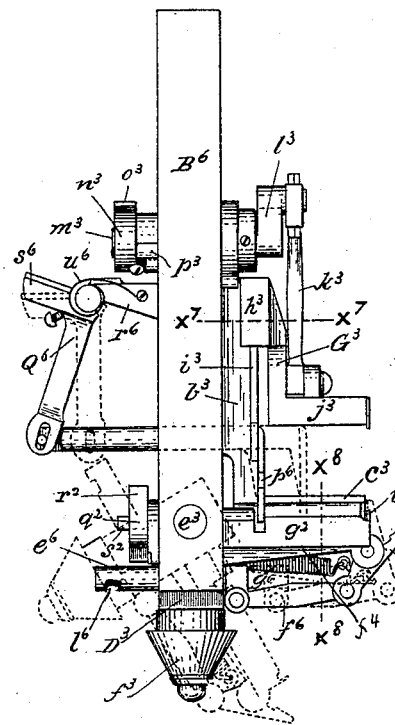
Figure 16:
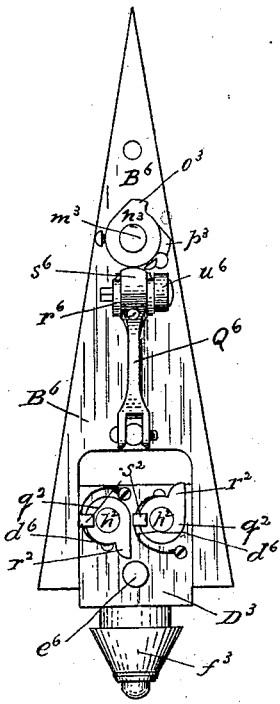
Figure 17:
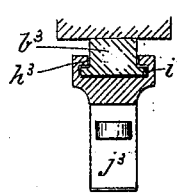
Figure 28:
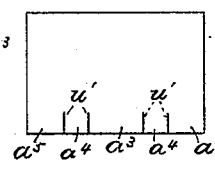
Figure 18:
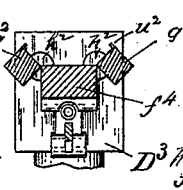
Figures 19, 20:
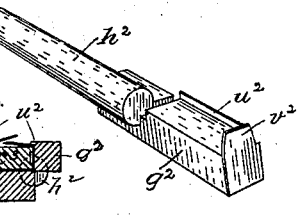
Figure 22:
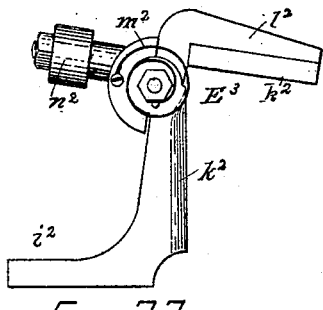
Figure 23:
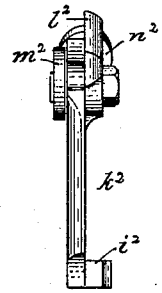
Figure 21:
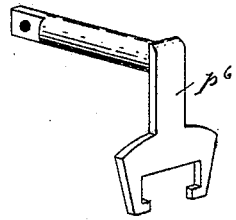

Figure 1 is a plan view; Fig. 2, an elevation of one side of the machine; Fig. 3, an elevation of the other side of the machine. Figs. 4 and 5 are respectively a rear elevation and section of the standard which supports the cam-plate, drawn to double the scale of the previous figures. Fig. 6 is a face view of the cam-plate on the same scale as Figs. 4 and 5. Figs. 7 to 13, inclusive, are part sections of the cam-plate on the lines $x$, $x'$, $x^2$, $x^3$, $x^4$, $x^5$, and $x^6$. Figs. 14, 15, and 16 are respectively front, side, and rear views of the folding-sections drawn to double the scale of Figs. 4 to 13, and being one-third full size. Fig. 17 is a sectional view on line $x^7$. Fig. 18 is a sectional view on line $x^8$, showing the side-folders turned part way up. Fig. 19 is a section on the same line as Fig. 18, but showing the side-folders closed quite up against the stock. Fig. 20 is a perspective view of the side-folder; Fig. 21, a similar view of the remover. Figs. 22 and 23 are side and front views of the shears. Figs. 24 and 25 are front and sectional views of the type-roll. Figs. 26 and 27 are similar views of the gluing-roll, the inner face of the wheel being removed; and Fig. 28 represents the paper blank.

The whole of the working parts of the machine are carried by the strong iron frame A, which is supported by the legs $a'$.

Motion is communicated from one part of the machine to another by trains of gear-wheels mounted on shafts journaled transversely on the frame A as follows, namely: The pulley B, which receives the driving-power through the belt $b'$, is secured on the shaft C, which rests in the boxes $c'$. On this shaft also is keyed the gear-pinion D, which drives the gear-wheel $d'$ on the shaft E. The wheel $d'$ drives the gear-wheel $c^4$, which is centered on a pivot fixed in the standard $e'$, and by this motion is communicated to the connected train of gear-wheels F, G, and H, which are centered on the shafts $f'$, $g'$, and $h'$, respectively journaled in their boxes on the frame A, as shown. The wheel H meshes into a spur gear-wheel on the counter-shaft I, which is journaled in the opposite sides of the frame A, and on which is also secured the spur gear-wheel $i'$. By this gear-wheel $i'$ motion is given to a train composed of gear-wheels J, K, L, and M, fixed, respectively, on the shafts $j'$, $k'$, $l'$, and $m'$. These shafts run in boxes held between the arms N N, and which are adjusted by the right and left hand screw-studs $n'$. On the front ends of these shafts $j'$ $k'$ $l'$ $m'$ are fixed the inking-rolls O, P, Q, and R, all in rolling contact one with another and supplied with ink or any approved coloring material from the vat S. The ink is thus conveyed down to the type-roll T on the front end of the counter-shaft I, and which is in contact with the inking-roll O, and is provided with type or relief plates bearing the device or inscription which is to be printed on the boxes. The paper O' is coiled up in the reel $p'$, (not shown in the plan view,) which is supported by the post $g'$, standing on the frame A. The paper in descending from the reel passes first over the check-rolls $r'$ and $s'$, by which it is prevented from running too freely into the machine. From these it passes over the type-roll T, which prints the desired inscription upon it, and against which it is held by the binding-roll U on the shaft $h'$. This type-roll is also provided with the adjustable spurs $t'$, by which the slits $u'$, Fig. 28, are made, thus dividing the edge of the paper into the portions $a^3$, $a^4$, and $a^5$. The paper then passes through the guide $v'$, over the glue-roll V on the end of the counter-shaft W, and under the binding-roll $w'$ on the shaft $f'$. In the glue-roll V a number of passages are made, radial in direction but of equal area throughout. In these passages the stamps $a^2$ are fitted so as to slide easily. The outer ends of these stamps are made corresponding in size and shape with the glue-spots that are suitable to the size and shape of the box that is being made.

The circumferential face of the glue-roll is placed at some distance from the binding-roll above it and does not touch the paper that is passing over it; but it is necessary that the stamps $a^2$ protrude far enough to touch the under side of the paper, so as to deposit upon it the glue which is on their ends. The inner ends of these stamps are provided with the laterally-projecting arms $b^2$, which project into the cam-groove $c^2$, which is made in the disk X. This disk is placed centrally in the glue-roll, but is in no way connected with it, being held firmly stationary by the arm $d^2$, which is secured to the frame of the machine. The shape of this groove is such that as the glue-roll revolves, carrying the stamps $a^2$ around with it, the stamps are held within or with their outer ends flush with the face of the roll during the greater portion of their circuit; but as they approach the point nearest to the binding-roll they are caused by the shape of the groove to dart suddenly outward, spot the paper with the glue on their ends, and then slide back into the glue-head. Before being moved outward, as above described, they pass under a scraper, $e^2$, which removes all superfluous glue from the roll. This glue-roll dips into the glue-vat Y, which contains the glue for the boxes. This vat is surrounded by an outer casing, between which and the vat itself steam or hot water is introduced for the purpose of keeping the glue in a liquid state. From the gluing-roll the paper passes directly onto the box-forming mechanism, which we will now proceed to describe.

On the front end of the shaft E is formed or secured the hub $f^2$, the outer face of which is faced off accurately at right angles to the axis of the shaft. To this hub a number of the sections shown in Figs. 14, 15, and 16 and on a much smaller scale in the general front view, Fig. 2, are rigidly attached, and swing around with the revolution of the shaft E, immediately in front of a stationary cam-plate, $A^6$, which is firmly secured to a standard, $A^7$, which is firmly bolted to the frame A, and by their contact with which the several parts of the sections are operated. These sections are precisely similar to each other in construction and are operated in the same manner. $B^6$ is the body of the section to which all its working parts are attached. A raised guide, $b^3$, is fixed longitudinally on the face of the body and has its outer end turned at a right angle, forming the stock $c^3$, around which the paper is folded to form the box. The part marked $D^3$ is the swinging block of the section. It swings in a gap formed in the body $B^6$, and is pivoted in it by the pin $e^3$. On the outer end of this block is pivoted a conical roll, $f^3$, which, by running upon a sloping margin, $g^3$, of the cam-plate, controls the swing of the block $D^3$.

The jaw $f^4$ is a rectangular body formed on or rigidly fixed to the block $D^3$, standing out forward at a right angle from it, and is so placed that when the swinging block is thrown forward this jaw will be closed to the under side of the stock $c^3$. Two side-folders, $g^2$, are placed on opposite sides of the jaw, but are attached only to the block $D^3$ by their journals, or cylindrical portions $h^2$ passing through closely-fitting bearings formed in it. The upper corner of each of these folders which is adjacent to the upper side edge of the jaw is in line with the axis of the cylinder, so that the rotation of the folder in its bearings in the block $D^3$ does not alter the relative position of these corners.

The first engagement of the section with the paper strip occurs when, having arrived at the lowest point in its circuit, its stock $c^3$ has come in contact with the paper, as shown in Fig. 2, and the jaw $f^4$ closes up against its under side, holding the paper fast against the stock $c^3$. The paper is then cut off by the shears $E^3$, (shown in Figs. 22 and 23,) which stand behind the sections. (See Fig. 2.) These shears are secured in place by screws passing through their base $i^2$ and into the holes $j^2$ in the section-bodies. The fixed blade $k^2$ of the shears stands out horizontally from the section-body, and swings down upon the top side of the paper strip. The working-blade $l^2$ is held open downward by the spring $m^2$ on its pivot until the roller $n^2$ on its outer end comes against the V-shaped cam $F^3$, passing under which closes the shears and severs the paper strip. This cam is held by the arm $o^2$, which is secured to the frame of the machine. Should the spring from any cause fail to open the shears immediately it has passed the angle of the cam, the roller $n^2$ would come against the finger $p^2$, by which the shears would be opened independently of the spring.

The journals of the side-folders project some distance from the rear side of the section-body $B^6$, and have fixed on them the disks $q^2$, which have the projections $r^2$ and knobs $s^2$. Immediately the shears have severed the paper, as above stated, the onward swing of the section brings the projections $r^2$ in succession against the rings or segmental guides $t^2$, so that by this means the disks are rotated and the side-folders turned up, as shown in Fig. 19, folding the paper up against the sides of the stock $c^3$, the lips $u^2$ on the side-folders bending the ends of the paper-box strips so as to cross-lap above the stock, while the end lips, $v^2$, in the same manner bend the portions of the paper marked $a^4$, Fig. 24, across the end of the stock. The stamper $G^3$ is then caused to descend upon the end portions of the paper above mentioned and the end-folder to close up the end of the box by the mechanism hereinafter described.

The stamper $G^3$ slides on the raised guide $b^3$, to which it is held by its wings $h^3$ clasping the guide-strips $i^3$ on the raised guide, its horizontal arm $j^3$ closing down the end portions of the box-strip against the stock $c^3$. It receives its reciprocating motion through the connecting-rod $k^3$, by which it is connected with the crank $l^3$ on the shaft $m^3$. This shaft extends through the body $B^6$, and protrudes from its rear side, where it has fixed on it the hub $n^3$. This hub has formed on it the two projections $o^3$ and $p^3$, the former of which, by coming against the end of the ring $H^3$ at $q^3$ and the latter at $r^3$, cause the crank $l^3$ to turn downward and lower the stamper, so as to close and hold the glued ends of the box-strips together.

The lip on the outer end of the horizontal arm $j^3$ bends the portions of the box-strips down over the end of the stock $c^3$. The end-folder $C^6$, which is centrally hinged to the jaw $f^4$, next folds up the portion of the box-strip marked $a^3$ against the glued portions $a^5$. Soon after the stamper has closed down upon the box-strips the side-folders are turned backward by their springs $d^6$, their disks having passed the ends of the segmental guides $t^2$. Should the springs $d^6$ fail to act, the side-folders would be turned back by the knobs $s^2$ on the disks $q^2$ coming against the reversing-blocks $y^2$. The end-folder is operated by the bar $e^6$, which slides through the swinging block, and is connected with the lower end of the end-folder by the connecting-rod $f^6$. A spring, $g^6$, holds the end folder open, as in Fig. 15, except when the rear end of the bar $e^6$, after passing through the channel $h^6$ of the cam-plate, is moved against and up the inclined plane $i^6$, by which it and the lower ends of the end-folder are pushed outward. (See dotted lines, Fig. 15.) The raised course $j^6$ of the cam-plate holds the bar outward until it reaches the receding slope $k^6$, against which it is held by the spring $g^6$, and by which means the end-folder is again opened. Should this spring fail to operate at this point, the bar would be drawn back by its transverse groove $l^6$ engaging on the sloping finger $m^6$. The continued circulation of the section next brings it opposite a gap, $N^6$, in the rim of the cam-plate. The conical roller $f^3$ of the swinging block drops into this gap, thus opening down the jaw $f^4$ from the stock. On the cam-plate and below the gap $N^6$ is a spring-plate, $N^7$, operating as a cushion to receive the roll $f^3$ and prevent shock to the swinging block as it falls into the gap. The jaw is held open during the remainder of its circuit by the segmental limb $O^6$, inside of which the conical roller of the swinging block passes. The box is then shoved off the stock by the hand $p^6$. (Shown in Fig. 21.) The fingers of this hand reach to the under side of the stock and a short distance under it from each side. The shaft to which the hand is secured slides through the body $B^6$, and is pivoted to an arm of the bell-crank $Q^6$, which is fulcrumed in the standard $r^6$ on the section-body.

After the jaw has dropped away from the stock the inward-projecting arm $s^6$ of the bell-crank meets the cam $T^6$, which tilts the bell-crank, pushes the hand $p^6$ outward, and thereby shoves the box off the stock finished. A spring, $u^6$, is secured to the standard $r^6$ and to the bell-crank, by means of which the hand is held back against the raised guide, except when moved forward, as above described. Should the spring fail to operate the bell-crank, it would be immediately reversed by its inwardly-projecting arm coming against the inturning-guide $v^6$. When the conical roll of the swinging block has arrived at the lower end of the segmental limb $O^6$, and just when the stock $c^3$ has touched the paper strip, it comes against the slope $w^6$, by which it is thrown forward on the sloping margin $g^3$, and the jaw $f^4$ thrown up against the stock $c^3$.

What we claim as our invention, and desire to secure by Letters Patent, is—

1. In a plug-box machine, the folding-sections secured to a shaft so as to rotate with it, and each consisting, mainly, of a body, $B^6$, swinging block $D^3$, stamper $G^3$, and end-folder $C^6$, in combination with the cam-plate $A^6$, secured to the frame A, and provided with the sloping margin $g^3$, segmental guides $t^2$, reversing-blocks $y^2$, channel $h^6$, raised course $j^6$, receding slope $k^6$, sloping finger $m^6$, gap $N^6$, segmental limb $O^6$, cam $T^6$, inturning-guide $v^6$, and slope $w^6$, substantially as and for the purpose set forth.

2. In a plug-box machine, the folding-sections secured to the shaft E so as to rotate with it, each of which consists, mainly, of the body $B^6$, swinging block $D^3$, stock $c^3$, side-folders $g^2$, stamper $G^3$, and end-folder $C^6$, all operated by being moved over the several faces of the cam-plate, as above described.

3. In a plug-box machine, a glue-roll provided with movable radial stamps constructed to remain substantially flush with the surface of the roll for a portion of its revolution and then be projected, a cam in the roll for effecting said movements of the stamps, a glue-vat into which the roll projects, and a scraper for removing superfluous glue, substantially as described.

4. In a plug-box machine, a roll, T, provided with radially-arranged spurs $t$, said spurs constructed to be fixed at varying distances radially from the axis of the roll.

5. In a plug-box machine, the folding mechanism consisting of a stock, $c^3$, a movable jaw, $f^4$, and side-folders $g^2$, movable with the jaw $f^4$, and pivoted to fold against the sides of the stock $c^3$ when the jaw $f^4$ is moved against the same.

6. In a plug-box machine, the combination of the fixed stock $c^3$, the movable jaw $f^4$, side-folders $g^2$, movable with said jaw, and the stamper $G^3$, substantially as described.

7. In a plug-box machine, the combination of the fixed stock $c^3$, the movable jaw $f^4$, the folder $C^6$, pivoted to said movable jaw, the side-folders $g^2$, and the stamper $G^3$, substantially as described.

8. In a plug-box machine, a folding mechanism consisting of a stock, $c^3$, a movable jaw, $f^4$, and side-folders $g^2$, movable with and journaled adjacent to opposite corners of the jaw, for the purpose specified.

9. In a plug-box machine, the combination, with a movable folder, of shears movable with and adjacent thereto, and consisting of a fixed blade and a movable blade provided with a spring for opening it, and a stationary cam engaging the movable blade to close it against the fixed blade, substantially as described.

Signed at Hull this 23d day of April, 1887.

GEO. H. MILLEN.
EDWARD MOUSSEAU.

In presence of—
S. S. CUSHMAN,
ALFRED LANE.